United States Patent

Hirose et al.

[11] Patent Number: 5,989,426
[45] Date of Patent: *Nov. 23, 1999

[54] OSMOSIS MEMBRANE

[75] Inventors: Masahiko Hirose; Hiroki Ito; Kazuo Tanaka, all of Shiga, Japan

[73] Assignee: Nitto Denko Corp., Osaka, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/677,322

[22] Filed: Jul. 2, 1996

[30] Foreign Application Priority Data

Jul. 5, 1995 [JP] Japan .................................. 7-169707
Jul. 13, 1995 [JP] Japan .................................. 7-177454

[51] Int. Cl.$^6$ .......................... B01D 29/00; B01D 63/00; B01D 61/00
[52] U.S. Cl. .............. 210/500.38; 210/490; 210/500.37; 210/257.2
[58] Field of Search .................................. 210/490, 506, 210/500.38, 200.37, 641, 257.2, 652, 195.2

[56] References Cited

U.S. PATENT DOCUMENTS

| | | | |
|---|---|---|---|
| 4,262,041 | 4/1981 | Eguchi et al. | 427/245 |
| 4,277,344 | 7/1981 | Cadotte | 210/654 |
| 4,337,154 | 6/1982 | Fukuchi et al. | 210/490 |
| 4,360,434 | 11/1982 | Kawaguchi et al. | 210/500.2 |
| 4,520,044 | 5/1985 | Sundet | 427/244 |
| 4,604,208 | 8/1986 | Chu et al. | 210/636 |
| 4,707,265 | 11/1987 | Barnes, Jr. et al. | 210/638 |

(List continued on next page.)

FOREIGN PATENT DOCUMENTS

| | | |
|---|---|---|
| 0 015 149 | 9/1980 | European Pat. Off. . |
| 0 498 596 | 8/1992 | European Pat. Off. . |
| 0 718 029 | 6/1996 | European Pat. Off. . |
| 0 718 030 | 6/1996 | European Pat. Off. . |
| 61-263602 | 11/1986 | Japan . |
| 62-121603 | 6/1987 | Japan . |
| 62-266103 | 11/1987 | Japan . |
| 63-012310 | 1/1988 | Japan . |
| 63-130105 | 6/1988 | Japan . |
| 63-218208 | 9/1988 | Japan . |
| 63-54905 | 9/1988 | Japan . |
| 1-180208 | 7/1989 | Japan . |
| 4341334 | 11/1992 | Japan . |
| 5-96141 | 4/1993 | Japan . |
| 5-309237 | 11/1993 | Japan . |
| 7-8770 | 1/1995 | Japan . |
| 8402648 | 3/1986 | Netherlands . |

OTHER PUBLICATIONS

European Search Report, Apr. 23, 1998.

*Primary Examiner*—Ana Fortuna
*Attorney, Agent, or Firm*—Merchant & Gould, P.C.

[57] ABSTRACT

A composite reverse osmosis membrane has a polyamide type skin layer whose specific surface area ranges from 3 to 1000. The composite reverse osmosis membrane of this invention is superior in the salt rejection property and water permeability. The composite reverse osmosis membrane comprises a negatively-charged crosslinked polyamide type skin layer obtained by reacting a compound having polyfunctional amino groups and a polyfunctional acid halide compound having polyfunctional acid halide groups, and a microporous support to support the skin layer. The specific surface area of the skin layer is at least 3. A first stage of reverse osmosis treatment is carried out in a membrane module using this composite reverse osmosis membrane. The skin layer can be coated with a layer of an organic polymer having positively-charged groups e.g. polyethyleneimine in order to be used as another membrane module. The organic polymer of this case is crosslinked, for example, by glutaraldehyde. The layer which is crosslink-coated on its surface area is a composite reverse osmosis membrane excellent in desalination of mineral salt in a low-concentration region and removal of cationic organic materials.

10 Claims, 1 Drawing Sheet

U.S. PATENT DOCUMENTS

| | | | |
|---|---|---|---|
| 4,758,343 | 7/1988 | Sasaki et al. | |
| 4,772,394 | 9/1988 | Swedo et al. | 210/500 |
| 4,792,404 | 12/1988 | Swedo et al. | 210/654 |
| 4,830,885 | 5/1989 | Tran et al. | 427/245 |
| 4,872,984 | 10/1989 | Tomaschke | 210/500.38 |
| 4,888,115 | 12/1989 | Marianaccio et al. | 210/636 |
| 4,950,404 | 8/1990 | Chau | 210/500.33 |
| 4,960,518 | 10/1990 | Cadotte et al. | 210/639 |
| 5,015,382 | 5/1991 | Sundet | 210/490 |
| 5,051,178 | 9/1991 | Uemura et al. | 210/500.38 |
| 5,069,945 | 12/1991 | Wrasidlo | 427/245 |
| 5,152,901 | 10/1992 | Hodgdon | 210/654 |
| 5,234,598 | 8/1993 | Tran et al. | 210/654 |
| 5,271,843 | 12/1993 | Chau et al. | 210/654 |
| 5,576,057 | 11/1996 | Hirose et al. | 427/245 |

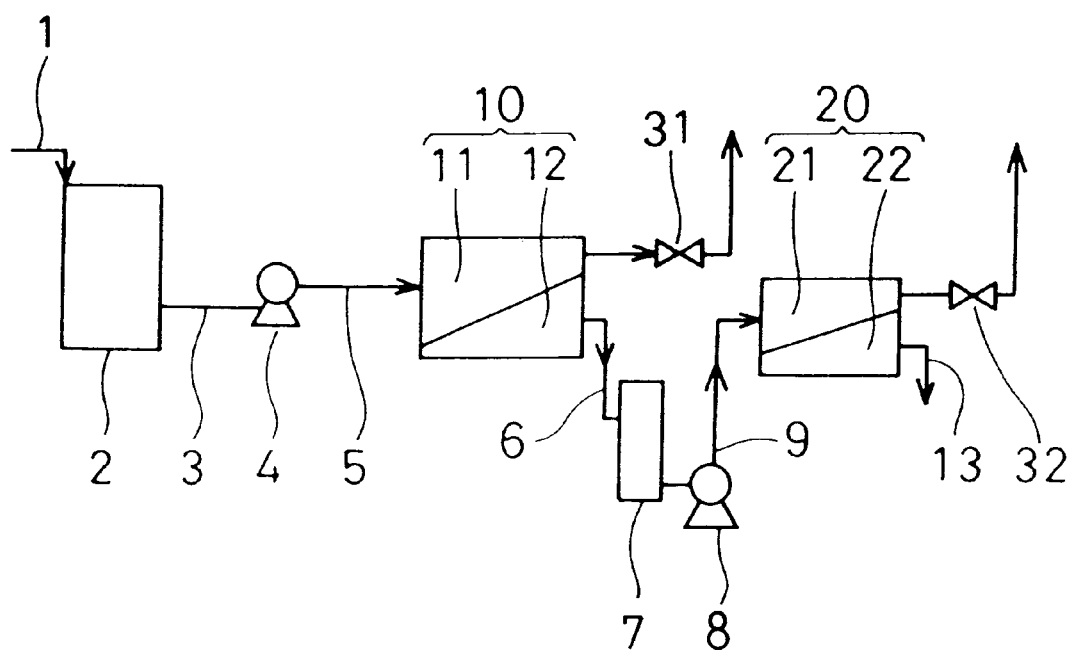
F I G. 1

OSMOSIS MEMBRANE

FIELD OF THE INVENTION

This invention relates to a composite reverse osmosis membrane for selectively separating components of a liquid mixture. More specifically, this invention relates to a composite reverse osmosis membrane having a microporous support on which an activated layer or a skin layer (thin film) mainly comprising polyamide is formed to provide both a high salt rejection property and a high permeability.

Such a composite reverse osmosis membrane is preferably used for many purposes, including manufacturing ultra-pure water and desalination of sea water or brackish water. This membrane also can be used to remove contamination source or to withdraw available materials from contamination of dyeing waste or electrochemical deposition coating waste. Such wastes may cause pollution. Thus this invention will clean contaminated water to be reused. The membrane of this invention also can be used for other purposes like condensing effective components for food.

BACKGROUND OF THE INVENTION

Several composite reverse osmosis membranes have been proposed, and such a conventional composite reverse osmosis membrane is produced by forming an activated skin layer having a substantially selective separability on a microporous support. This reverse osmosis membrane has a different structure from that of an asymmetric reverse osmosis membrane.

Several composite reverse osmosis membranes, each having been formed on a support as a thin film and comprising a polyamide obtained by an interfacial polymerization of a polyfunctional aromatic amine and polyfunctional aromatic acid halide, are disclosed in e.g., JP-A-55-147106, JP-A-62-121603, JP-A-63-218208, and JP-A-2-187135. The term "JP-A" means an "unexamined published Japanese patent application".

Other prior art references disclose composite reverse osmosis membranes wherein skin layers comprising polyamide are formed on supports, and the polyamide is obtained by an interfacial polymerization of a polyfunctional aromatic amine and a polyfunctional alicyclic acid halide (cf. JP-A-61-42308).

The composite reverse osmosis membranes described above have a high desalination property and a high water permeability, but it has further been desired for those membranes to improve the water permeability while keeping the high desalination property from the standpoint of the efficiency and lowering the cost for operation or equipment. For these requirements, various kinds of additives are proposed e.g., in JP-A-63-12310. However, in the conventional composite reverse osmosis membranes, the improvement of the water permeability is still insufficient even where these additives are used, and a composite reverse osmosis membrane having a higher water permeability has been desired.

Such a composite reverse osmosis membrane has a support on which a skin layer of polyamide obtained by interfacial polymerization between the polyfunctional aromatic amine and the aromatic or alicyclic polyfunctional halide. The polyamide of the membrane has negatively charged fixed groups. Thus, the anion exclusion rate is high while the cation is hardly excluded in a high pH region when desalination of mineral salt is conducted in a low-concentration region. In order to solve such problems, JP-A-62-266103 discloses a composite osmosis membrane which comprises an activated layer on which an organic polymer having positively charged fixed groups is coated. This membrane is manufactured to function as an adsorptive film. Thus, the predetermined efficiency will deteriorate after the membrane is used repeatedly. This membrane is especially inadequate for use as a second membrane in a two-stage reverse osmosis treatment (RO) conducted before preparing ultra-pure water for manufacturing semiconductors. In this newly-developed treatment, a negatively-charged membrane having high desalination property is used in the first stage, and the permeated liquid is supplied for the second stage. Thus, the desalination efficiency is deteriorated if the two membranes have the same characteristics.

SUMMARY OF THE INVENTION

It is an object of this invention to solve the above-mentioned problems by providing a composite reverse osmosis membrane that has a high salt rejection property and a high water permeability. Another object of this invention is to provide a composite reverse osmosis membrane that is superior in desalination of mineral salts in the lower concentration region and removal of cationic organic materials while keeping a high salt rejection property and a high water permeability.

In order to accomplish these and other objects and advantages, a highly permeable composite reverse osmosis membrane of this invention comprises a polyamide type skin layer comprising a reaction product of a compound having at least two reactive amino groups and a polyfunctional acid halide compound having at least two reactive acid halide groups. This composite reverse osmosis membrane also comprises a microporous support to support the thin film. The specific surface area of the polyamide type skin layer ranges from 3 to 1000. According to this invention, a composite reverse osmosis membrane having high salt rejection property and high water permeability is provided.

It is preferable that the surface area of the polyamide type skin layer of the composite reverse osmosis membrane is further coated with a crosslinked layer of organic polymers having positively-charged groups, so that the composite reverse osmosis membrane maintains high salt rejection and high water permeability while it is excellent in desalination of mineral salt in a low-concentration region and in removing cationic organic materials.

It is also preferable that the crosslinked layer also can comprise organic polymers having positively-charged groups made by crosslinking polymers having quaternary ammonium groups and hydroxyl groups, and the crosslinking system is at least the one selected from the group consisting of an intramolecular link and an intermolecular link.

It is also preferable that the crosslinked layer also can comprise organic polymers having positively-charged groups made by crosslinking polymers containing polyethyleneimine.

It is further preferable that the average molecular weight of the polyethyleneimine is at least 300. It is further preferable that the average molecular weight of the polyethyleneimine ranges from 500 to 500,000.

It is preferable that the crosslinked layer of organic polymers having positively-charged groups is 1 nm-10 μm thick.

It is preferable that the composite reverse osmosis membrane of this invention is used as a reverse osmosis membrane in a membrane module which is used for the second or later stage of a multi-stage reverse osmosis treatment equipment.

It is preferable in this invention that the specific surface area of the polyamide type skin layer ranges from 3 to 1000, more preferably, 3.1 to 500. If the specific surface area is less than 3, the water permeability is not sufficient. When the specific surface area exceeds 1000, the strength of the skin layer is deteriorated, and thus the skin layer may be easily damaged. As a result, the composite reverse osmosis membrane will become unpractical. If the specific surface area is in the range from 3.1 to 500, an excellent highly permeable composite reverse osmosis membrane can be provided. The permeation flux of the membrane is at least 0.65 m$^3$/m$^2$·day after a water solution (pH 6.5) containing 500 ppm of sodium chloride is permeated for one hour with an operation pressure of 7.5 kg/cm$_2$ at 25° C., and the skin layer has sufficient strength.

The specific surface area of the skin layer which is applied in this invention is expressed as the following equation.
Specific surface area of skin layer=surface area of skin layer/surface area of microporous support The "surface area of the skin layer" means the face contacting with the supply liquid (the side which does not contact with the microporous support). The "surface area of microporous support" means the surface area of the face contacting with the skin layer.

The calculation to obtain the specific surface area is substantially the same as the general method so the method is not limited. For example, a specific surface area measuring device, a surface area measuring device, a scanning electron microscope (SEM, FE-SEM), and a transmission electron microscope (TEM) can be used.

The composite reverse osmosis membrane of this invention is produced by adding at least one compound having a solubility parameter of 8–14(cal/cm$^3$)$^{1/2}$ when a compound having at least two reactive amino groups and a polyfunctional acid halide compound having at least two reactive acid halide groups react, and the reaction is an interfacial polycondensation. The compound to be added is selected from the group consisting of alcohols, ethers, ketones, esters, halogenated hydrocarbons, nitrogen-containing compounds and sulfur-containing compounds. Namely, a compound having the above-described solubility parameter is added to at least one of the solutions of the above-described compounds before the interfacial polycondensation is conducted.

BRIEF DESCRIPTION OF THE DRAWING

FIG. 1 shows a process of multi-stage reverse osmosis treatment used in Examples 2 and 3 of this invention.

DETAILED DESCRIPTION OF THE INVENTION

The composite reverse osmosis membrane of this invention is produced by adding at least one compound having a solubility parameter of 8–14(cal/cm$^3$)$^{1/2}$ when a compound having at least two reactive amino groups and a polyfunctional acid halide compound having at least two reactive acid halide groups react, and the reaction is an interfacial polycondensation. The compound to be added is selected from the group consisting of alcohols, ethers, ketones, esters, halogenated hydrocarbons, nitrogen-containing compounds and sulfur-containing compounds. Namely, a compound having the above-described solubility parameter is added to at least one of the solutions before the interfacial polycondensation is conducted.

The alcohols include, for example, ethanol, propanol, butanol, 1-pentanol, 2-pentanol, t-amyl alcohol, isoamyl alcohol, isobutyl alcohol, isopropyl alcohol, undecanol, 2-ethyl butanol, 2-ethyl hexanol, octanol, cyclohexanol, tetrahydro furfuryl alcohol, neopentyl glycol, t-butanol, benzyl alcohol, 4-methyl-2-pentanol, 3-methyl-2-butanol, allyl alcohol, ethylene glycol, diethylene glycol, triethylene glycol, and tetraethylene glycol.

The ethers include, for example, anisole, ethyl isoamyl ether, ethyl-t-butyl ether, ethylbenzyl ether, crown ether, cresyl metyl ether, diisoamyl ether, diisopropyl ether, diethyl ether, dioxane, diglycidyl ether, cineol, diphenyl ether, dibutyl ether, dipropyl ether, dibenzyl ether, dimethyl ether, tetrahydropyran, tetrahydrofuran, trioxane, dichloroethyl ether, butyl phenyl ether, furan, methyl-t-butyl ether, monodichlorodiethyl ether, ethylene glycol dimethyl ether, ethylene glycol diethyl ether, ethylene glycol dibutyl ether, ethylene glycol monomethyl ether, ethylene glycol monoethyl ether, ethylene glycol monobutyl ether, diethylene glycol dimethyl ether, diethylene glycol diethyl ether, diethylene glycol dibutyl ether, diethylene glycol monomethyl ether, diethylene glycol monoethyl ether, diethylene glycol monobutyl ether, and diethylene chlorohydrin.

The ketones include, for example, ethyl butyl ketone, diacetone alcohol, diisobutyl ketone, cyclohexanone, 2-heptanone, methyl isobutyl ketone, methyl ethyl ketone, and methyl cyclohexane.

The esters include, for example, methyl formate, ethyl formate, propyl formate, butyl formate, isobutyl formate, isoamyl formate, methyl acetate, ethyl acetate, propyl acetate, butyl acetate, isobutyl acetate, and amyl acetate.

The halogenated hydrocarbons include, for example, allyl chloride, amyl chloride, dichloromethane, and dichloroethane.

The nitrogen-containing compounds include, for example, nitromethane and formamide.

The sulfur-containing compounds include, for example, dimethyl sulfoxide, sulfolane, and thiolane. Among these compounds, alcohols and ethers are especially preferable. These compounds can be used either alone or as mixtures thereof.

According to this invention, the composite reverse osmosis membrane comprises a polyamide type skin layer comprising a reaction product of a compound having at least two reactive amino groups and a polyfunctional acid halide compound having at least two reactive acid halide groups. The composite reverse osmosis membrane of this invention also comprises a microporous support to support the skin layer. When the specific surface area of the polyamide type skin layer ranges from 3 to 1000, both high salt rejection property and high water-permeability are maintained.

In other words, the performance of a composite reverse osmosis membrane and the specific surface area of the polyamide type skin layer are closely related each other. Thus, a composite reverse osmosis membrane which has a high water permeability while keeping a high salt rejection property is provided by controlling the specific surface area of the polyamide type skin layer.

The amine component used in this invention is not limited as long as the amine component is a polyfunctional amine having at least two reactive amino groups, for example, aromatic, aliphatic, and alicyclic polyfunctional amines.

The examples of the aromatic polyfunctional amines are, m-phenylenediamine, p-phenylenediamine, 1,3,5-triaminobenzene, 1,2,4-triaminobenzene, 3,5-diaminobenzoic acid, 2,4-diaminotoluene, 2,4-diaminoanisole, amidol, and xylylenediamine.

The examples of the aliphatic polyfunctional amines are ethylenediamine, propylenediamine, and tris(2-diaminoethyl)amine.

The examples of the alicyclic polyfunctional amines are, 1,3-diaminocyclohexane, 1,2-diaminocyclohexane, 1,4-diaminocyclohexane, piperazine, 2,5-dimethylpiperazine, and 4-aminomethylpiperazine. Those amines can be used alone or as mixtures thereof.

The polyfunctional acid halide used in this invention is not particularly limited, and the examples include aromatic, aliphatic, and alicyclic polyfunctional acid halides.

The examples of the aromatic polyfunctional acid halides are trimesic acid chloride, terephthalic acid chloride, isophthalic acid chloride, biphenyldicarboxylic acid chloride, benzene trisulfonic acid chloride, benzene disulfonic acid chloride, chlorosulfonium benzene dicarboxylic acid chloride, and naphthalenedicarboxylic acid dichloride.

The examples of the aliphatic polyfunctional acid halides are propanetricarboxylic acid chloride, butanetricarboxylic acid chloride, pentanetricarboxylic acid chloride, glutaryl halide, and adipoyl halide.

The examples of the alicyclic polyfunctional acid halides are cyclopropanetricarboxylic acid chloride, cyclobutanetetracarboxylic acid chloride, cyclopentanetricarboxylic acid chloride, cyclopentanetetracarboxylic acid chloride, cyclohexanetricarboxylic acid chloride, tetrahydrofurantetracarboxylic acid chloride, cyclopentanedicarboxylic acid chloride, cyclobutanedicarboxylic acid chloride, cyclohexanedicarboxylic acid chloride, and tetrahydrofurandicarboxylic acid chloride. Those acid halides can be used alone or as mixtures thereof.

According to this invention, a composite reverse osmosis membrane having a skin layer mainly comprising a crosslinked polyamide on a microporous support is obtained by interfacial polymerization of the above-described compound having at least two reactive amino groups and the above-described polyfunctional acid halide compound having at least two reactive acid halide groups.

The microporous support for supporting the skin layer described above is not particularly limited as long as the support can support the skin layer, and the examples are polysulfone, polyaryl ether sulfones such as polyether sulfone, polyimide and polyvinylidene fluoride. A microporous support comprising polysulfone or polyaryl ether sulfone is especially preferable because it is stable chemically, mechanically and thermally. Such a microporous support is usually about 25 to 125 $\mu$m thick, and preferably, about 40 to 75 $\mu$m thick, but the thickness is not necessarily limited to those ranges.

In more detail, the composite reverse osmosis membrane can be obtained by forming a first layer comprising the solution containing the compound having at least two reactive amino groups on the microporous support, forming a second layer comprising the solution containing the acid halide component on the first layer, and then carrying out the interfacial polycondensation to form a skin layer comprising a crosslinked polyamide on the microporous support.

The solution containing the compound having at least two amino groups can contain water soluble polymers such as polyvinyl alcohol, polyvinyl pyrrolidone, polyacrylic acid, and/or a polyhydric alcohol such as sorbitol, glycerol, in order to facilitate the film formation and improve the performance of the composite reverse osmosis membranes.

The amine salts described in JP-A-2-187135, such as a salt of a tetraalkylammonium halide or a trialkylamine and an organic acid can also be suitably used for the solution to facilitate the film formation, improve the absorption of the amine solution in the support, and accelerate the condensation reaction.

The solution can further contain a surfactant such as sodium dodecylbenzenesulfonate, sodium dodecylsulfonate, and sodium laurylsulfonate. Such a surfactant has an effect for improving the wettability of the solution containing the polyfunctional amine for the microporous support. Furthermore, for accelerating the polycondensation reaction at the interface, it is effective to use sodium hydroxide or sodium tertiary phosphate capable of removing a hydrogen halide formed by the interfacial reaction or to use an acylation catalyst as a catalyst.

The concentration of the acid halide and the concentration of the polyfunctional amine are not particularly limited to the solution containing the acid halide and also the solution containing the polyfunctional amine described above, but the concentration of the acid halide is usually from 0.01 to 5 wt %, and preferably from 0.05 to 1 wt %. The concentration of the polyfunctional amine is usually from 0.1 to 10 wt %, and preferably, from 0.5 to 5 wt %.

The microporous support is coated with the solution containing at least two amino groups and, then the solution containing the acid halide compound is coated thereon. After the extra solutions are removed, the coated layers are heated and dried, usually at about 20 to 150° C., preferably about 70 to 130° C., for about one to ten minutes, preferably about two to eight minutes, so that a water permeable skin layer of crosslinked polyamide is formed. The skin layer is usually 0.05 to 2 $\mu$m thick, and preferably, about 0.1 to 1 $\mu$m thick.

A composite reverse osmosis membrane used in this invention has a negatively-charged crosslinked polyamide type skin layer which is coated with a crosslinked layer of organic polymers having positively-charged groups, so that desalination of low-concentration mineral salt and removal of cationic organic materials can be conducted.

The structure of the organic polymers is not particularly limited, as long as the negatively-charged crosslinked polyamide type skin layer is coated with the crosslinked layer of organic polymers having positively-charged groups.

However, it is favorable in this invention that the organic polymers are soluble in a solvent in view of the processability and workability. Therefore, it is preferable that the organic polymers are crosslinked three-dimensionally after they are coated on a composite reverse osmosis membrane. For such purposes, organic polymers which have positively-charged groups and polyfunctional groups to cause a crosslinking reaction in the molecules are used, and the organic polymers should be soluble in a solvent. For example, polymers A and B can be used. Both polymers A and B have positively-charged groups and at least two hydroxylic groups and/or amino groups. Polymer B also has two protected isocyanate groups.

The positively-charged groups include ammonium groups, phosphonium groups, and sulfonium groups. The protected isocyanate groups are isocyanate groups blocked by using a blocking agent, or isocyanate groups protected in the form of amineimide groups.

Various blocking agents for blocking isocyanate groups are known. The examples are the phenol family including phenol and cresol, the alcohol family including methanol, ethanol and methyl cellosolve, and the oxime family including methyl ethyl ketoxime and acetaldehyde oxime.

The polymer A includes a homopolymer of hydroxypropyl methacrylate trimethyl ammonium chloride and its copolymer with another polymerizable monomer, a copolymer of ethyl methacrylate trimethyl ammonium chloride and hydoroxyethyl methacrylate, and a quaternary copolymer of 4-vinylpyridine and hydroxyethyl methacrylate.

The polymer B includes a copolymer of hydroxypropyl methacrylate trimethylammonium chloride and an isocyanate monomer formed by blocking 2-methacryloyl oxyethylene isocyanate with a proper quantity of blocking agent, a quaternary compound of the copolymer of the blocked isocyanate and 4-vinylpyridine and hydroxyethyl methacrylate, and a copolymer of hydroxypropyl methacrylate trimethyl ammonium chloride and a vinyl monomer having amineimide groups like 1,1-dimethyl-1-(2-hydroxypropyl)amine methacryl imide.

Both of the polymers A and B are soluble in water and alcohol. Therefore, a crosslinked polymer layer of this invention can be formed on a skin layer of a composite reverse osmosis membrane by several methods as follows.

A crosslinked polymer layer is formed by coating a water solution or alcohol solution of polymer A on a composite reverse osmosis membrane, drying the membrane, contacting the membrane with a solution in which a polyisocyanate compound as a polyfunctional crosslinking agent is dissolved, and crosslinking the polymer A intermolecularly by heating if necessary.

Otherwise, the crosslinked polymer layer is formed by preparing an aqueous solution or alcohol solution of the polymer A by adding the polyfunctional isocyanate compound blocked with the blocking agent, coating the solution on a composite reverse osmosis membrane, and heating to the dissociation temperature of the blocked polyisocyanate or above so that the polyisocyanate compound will be freed and crosslinked with the polymer A.

The polyisocyanate compound is not particularly limited. The examples are tolylenediisocyanate, diphenylmethanediisocyanate, or the polymers of these substances, isophoronediisocyanate, hexamethylenediisocyanate, triphenylmethanetriisocyanate, tris(p-isocyanatephenyl)thiophosfate, an addition polymer of trimethylol propane and trilenediisocyanate, and an addition polymer of trimethylol propane and xylylenediisocyanate.

The crosslinked polymer layer of the polymer B can be formed on the composite reverse osmosis membrane by, for example, coating an aqueous solution or alcohol solution of polymer B on a composite reverse osmosis membrane, and heating the membrane to the dissociation temperature or above of the blocked isocyanate in order to free and crosslink the isocyanate groups, and the crosslink system is at least one selected from the group consisting of an intramolecular link and an intermolecular link.

In order to accelerate the crosslinking reaction by the isocyanate groups and hydroxyl groups, catalysts like a tertiary amine or an organotin compound can be used if necessary during the crosslinking reaction.

Here, polyethyleneimine is an example of the crosslinked layer of the organic polymers having positively-charged groups, so that the desalination property to exclude a low-concentration mineral salt and the property to exclude cationic organic materials can be kept stable for a long time. For the purpose, catalysts including glyoxal and glutaraldehyde are used, and glutaraldehyde is specifically preferable in the light of the molecular weight. The method of coating the crosslinked layer on the negatively-charged crosslinked polyamide type skin layer is not limited. In one embodiment, an aqueous solution of polyethyleneimine is coated on or impregnated into the negatively-charged crosslinked polyamide type skin layer, then the polyethyleneimine is crosslinked by the above-described crosslinking agent. In another embodiment, polyethyleneimine is added to the raw water during a reverse osmosis treatment, and the crosslinking agent is added in the same manner after washing process. In this case, the concentation of the polyethyleneimine is usually from 0.1 to 10 wt %, preferably, 1 to 5 wt %. The concentration of the crosslinking agent is usually 0.01 to 10 wt %, or preferably, 1 to 5 wt %.

Even if the organic polymer does not have crosslinking functional groups, it is possible to create a radical on the framework of the organic polymer and to provide three-dimensional crosslinking. For this purpose, an electric beam can be irradiated on the composite reverse osmosis membrane after the positively-charged organic polymer is coated thereon. Or a peroxide is mixed into the solution of the organic polymer, and the solution is coated on a composite reverse osmosis membrane and heated.

When polyethyleneimine is used as an organic polymer having positively-charged groups and glutaraldehyde is used as a crosslinking agent, a polyethyleneimime crosslinked layer is formed by the reaction shown in the following Chemical Formula 1,

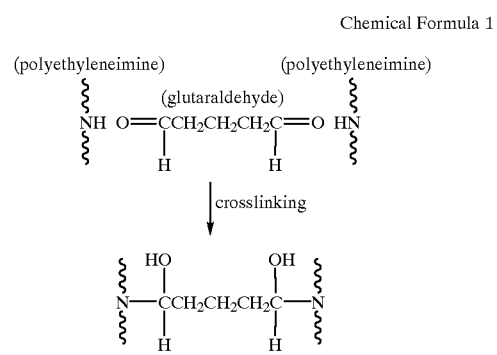

Chemical Formula 1

The average molecular weight of the polyethyleneimine used in this step is preferably at least 300. It is further preferable that the average molecular weight is at least 500.

It is also preferable that the crosslinked polymer layer is 1 nm-10 μm thick. When the layer is thinner than 1 nm, the desalination property is not substantially improved even if the composite reverse osmosis membrane is used in a two-stage reverse osmosis system. On the other hand, if it is thicker than 10 μm, the permeability of the membrane is considerably deteriorated.

FIG. 1 shows an example of multi-stage reverse osmosis treatment processes conducted in this invention. In FIG. 1, number 1 is a supply line for raw liquid (raw water) like well water or water for industrial use. Number 2 is a tank to store the raw liquid (raw water). Number 3 is a transmission line to connect the tank 2 and a first transmission pump 4. Number 5 is a transmission line to connect the first transmission pump 4 and a membrane module 10 of the first stage. Number 11 is a raw liquid chamber of the membrane module 10 for the first stage. Number 12 is a permeable chamber of the module 10. The raw liquid (raw water) can be filtered or treated biologically before the water reaches the supply line 1. A reverse osmosis membrane is provided between the raw liquid chamber 11 of the first stage membrane module 10 and the permeable chamber 12, so that the reverse osmosis treatment of the first stage is conducted. The first stage permeated liquid out of the permeable chamber 12 is transmitted to a transmission line 6. The liquid is stopped and stored at a storage means 7 like an intermediate tank or a pipe header to store a predetermined quantity of liquid. Then the liquid is passed through a transmission line 9 by using the second transmission pump 8, and reaches a membrane module 20 of the second stage. A reverse osmosis membrane of this invention is provided between a raw liquid chamber 21 of the membrane module 20 of the second stage and a permeable chamber 22, so that the second stage reverse osmosis treatment is conducted. The second stage permeated liquid (ultra-pure water) out of the permeable chamber 22 is taken out from the takeoff line 13. Number 31 is a pressure-control valve which is provided at the exit side of the raw liquid chamber 11 of the membrane module 10 of the first stage. Number 32 is another pressure-control valve which is provided at the exit side of the raw liquid chamber 21 of the membrane module 20 of the second stage. The operation pressures of the raw liquid chambers 11 and 21 are controlled with valves 31 and 32 respectively.

In this multi-stage reverse osmosis treatment process, it is preferable for an example of the membrane module 10 of the first stage that a composite reverse osmosis membrane comprising negatively-charged crosslinked polyamide type skin layer and a microporous support to support the skin layer are used. The skin layer is formed by interfacial polycondensation of a compound having at least two reactive amino groups and a polyfunctional acid halide compound having at least two reactive acid halide groups. And for the membrane module 20 of the second stage, a composite reverse osmosis membrane comprising a crosslinked polyamide type skin layer and a microporous support to support the layer is used. The skin layer comprises a reaction product of a compound having at least two reactive amino groups and a polyfunctional acid halide compound having at least two reactive acid halide groups. The specific surface area of the skin layer is at least 3, and the surface of the skin layer is coated with a crosslinked layer of an organic polymer having positively-charged groups.

This invention is described in detail by referring to the following examples, but the examples do not limit the scope of this invention.

A polysulfone type ultrafiltration membrane was used as the microporous support. The sodium chloride rejection and the permeation flux of the obtained composite reverse osmosis membrane were measured after an aqueous solution of pH 6.5 containing 500 ppm of sodium chloride was permeated for one hour with an operation pressure of 7.5 kg/cm$^2$ at 25° C. The sodium chloride rejection was measured according to a general conductivity measurement.

EXAMPLE 1

A layer of an aqueous solution was formed on a microporous polysulfone supporting film by contacting for several seconds the solution with the supporting film and removing extra solution. The solution contained 3.0 wt % of m-phenylenediamine, 0.15 wt % of sodium laurylsulfate, 3.0 wt % of triethylamine, 6.0 wt % of camphor sulfonic acid, and 5.0 wt % of isopropyl alcohol.

Then, a composite reverse osmosis membrane was obtained by contacting IP1016 solution (isoparaphin type hydrocarbon oil made by IDEMITSU Chemical Co. Ltd.) containing 0.20 wt % of trimesic acid chloride and 0.05 wt % of isopropyl alcohol with the surface area of the supporting film that was previously coated with the aqueous solution, and holding the film at 120° C. in a hot air dryer for three minutes so that a skin layer was formed on the supporting film.

The composite reverse osmosis membrane was washed in water and dried. Then the section of composite reverse osmosis membrane was measured by TEM. The specific surface area of the polyamide type skin layer was 4.3.

When the performance of the composite reverse osmosis membrane thus obtained was evaluated, the salt rejection was 99.5% and the permeation flux was 1.0 m$^3$/m$^2$·day.

COMPARATIVE EXAMPLE 1

A composite reverse osmosis membrane was obtained in the same way as shown in Example 1 except that isopropyl alcohol was not added to the aqueous solution and the IP1016 solution. The specific surface area of the obtained composite reverse osmosis membrane was 2.2.

The salt rejection was 99.5% and the permeation flux was 0.5 m$^3$/m$^2$·day.

As clear from this comparative example, the value of the specific surface area of a polyamide type skin layer is greatly related to its permeation flux. Therefore, a highly permeable composite reverse osmosis membrane can be provided by controlling its specific surface area.

Reference 1

Methyl ethyl ketoxime weighing 29 g was dissolved in 50 g of benzene. At a temperature of 25° C., 51.6 g of 2-methacroyl oxyethylene isocyanate was dropped into the solution in about 40 minutes. And the solution was stirred at 45° C. for two hours. The reacted product was analyzed by proton NMR, which confirmed that the product was a blocked substance in which methyl ethyl ketoxyme was attached almost quantitavely to 2-methacroyl oxyethylene isocyanate.

Reference 2

Methacrylate hydroxy propyl trimethyl ammonium chloride (16 g) and 8 g of the blocked isocyanate compound of Reference 1 were dissolved into 60 g of methanol. Azobisisobutyronitrile (0.4 g) was added to this solution and the solution was stirred at 60° C. under an atmosphere of nitrogen gas for six hours. As a result, a copolymer having quaternary ammonium groups and hydroxyl groups was obtained.

EXAMPLE 2

A layer of an aqueous solution was formed on a microporous polysulfone supporting film by contacting the solution with the supporting film and removing extra solution. The solution contained 3.0 wt % of m-phenylenediamine, 0.15 wt % of sodium laurylsulfate, 3.0 wt % of triethylamine, 6.0 wt % of camphor sulfonic acid, and 5.0 wt % of isopropyl alcohol.

Then, a composite reverse osmosis membrane was obtained by contacting the IP1016 solution containing 0.20 wt % of trimesic acid chloride and 0.05 wt % of isopropyl alcohol with the surface area of the supporting film that was previously coated with the aqueous solution, and holding the film at 120° C. in a hot air dryer for three minutes so that a skin layer was formed on the supporting film.

The composite reverse osmosis membrane was washed in water and dried. Then the section of the composite reverse osmosis membrane was analyzed by TEM. As a result, the specific surface area of the polyamide type skin layer was 4.3.

The 1 g of the copolymer obtained in Reference 2 was dissolved in water in order to prepare 1 wt % of an aqueous solution, and 0.005 g of 1,4-azabicyclo(2,2,2)octane as a crosslinking catalyst was added thereto. This solution was coated on the composite reverse osmosis membrane and heated at 150° C. for ten minutes in order to crosslink the copolymers. As a result, a positively-charged composite reverse osmosis membrane (A) was obtained.

Next, a layer of an aqueous solution was formed on a microporous polysulfone supporting film by contacting for several seconds the solution with the supporting film and removing extra solution. The solution contained 2.0 wt % of m-phenylenediamine, 0.25 wt % of sodium laurylsulfate, 2.0 wt % of triethylamine, and 4.0 wt % of camphor sulfonic acid.

Then, a composite reverse osmosis membrane (B) was obtained by contacting the IP1016 solution containing 0.10 wt % of trimesic acid chloride and 0.15 wt % of isophthalic acid chloride with the surface area of the supporting film that was previously coated with the aqueous solution, and holding the film at 120° C. in a hot air dryer for three minutes so that a skin layer was formed on the supporting film. The specific surface area of the skin layer of the obtained composite reverse osmosis membrane (B) was 2.2.

Then, the property of the composite reverse osmosis membrane (A) was measured by using the process shown in FIG. 1. In the process, the composite reverse osmosis membrane (B) was used for the first stage and the composite reverse osmosis membrane (A) was used for the second stage. The raw liquid was well water of pH 6.5 and its electric conductivity was 100 $\mu$s/cm. The well water was transmitted to the composite reverse osmosis membrane (B) with 30 kgf/cm$_2$ of operation pressure and became the supplied water. The property of the membrane (A) was measured at an operation pressure of 15 kgf/cm$^2$. The resistivity value was 9.5M $\Omega$·cm and the permeation flux was 1.7 m$^3$/(m$^2$·day).

COMPARATIVE EXAMPLE 2

A composite reverse osmosis membrane (C) was attained in the same method explained in Example 2 to manufacture the composite reverse osmosis membrane (B) the surface condition thereof was similar to a conventional reverse osmosis membrane, except that IP1016 was not added to the solution containing isophthalic acid chloride. The property was examined as in the Example 2 in which the composite reverse osmosis membrane (B) was used for the first stage and the composite reverse osmosis membrane (C) was used for the second stage. The resistivity value was 7.7M $\Omega$·cm, and the permeation flux was 0.9 m$^3$/(m$^2$·day). The permeation flux and the resistivity value were inferior to those of Example 2.

EXAMPLE 3

A layer of an aqueous solution was formed on a microporous polysulfone supporting film by contacting the solution with the supporting film and removing extra solution. The solution contained 3.0 wt % of m-phenylenediamine, 0.15 wt % of sodium laurylsulfate, 3.0 wt % of triethylamine, 6.0 wt % of camphor sulfonic acid, and 5.0 wt % of isopropyl alcohol.

Then, a composite reverse osmosis membrane was obtained by contacting the IP1016 solution containing 0.20 wt % of trimesic acid chloride and 0.05 wt % of isopropyl alcohol with the surface area of the supporting film that was previously coated with the aqueous solution, and holding the film at 120° C. in a hot air dryer for three minutes so that a skin layer was formed on the supporting film.

The composite reverse osmosis membrane was washed in water and dried. Then the section of the composite reverse osmosis membrane was analyzed by TEM. The specific surface area was 4.3.

Next, 1 wt % of polyethyleneimine was added to the supplied pure water, and a reverse osmosis treatment was conducted. Then, the inside of the system was washed with water pump, and 1 wt % of glutaraldehyde was added to the supplied pure water, so that a positively-charged composite reverse osmosis membrane (D) was obtained by treating and crosslinking polyethyleneimine.

Then, a layer of an aqueous solution was formed on a microporous polysulfone supporting film by contacting the solution with the supporting film for a few seconds and removing extra solution. The solution contained 2.0 wt % of m-phenylenediamine, 0.25 wt % of sodium laurylsulfate, 2.0 wt % of triethylamine, and 4.0 wt % of camphor sulfonic acid.

Then, a composite reverse osmosis membrane was obtained by contacting the IP1016 solution containing 0.10 wt % of trimesic acid chloride and 0.15 wt % of isophthalic acid chloride with the surface area of the supporting film that was previously coated with the aqueous solution, and holding the film at 120° C. in a hot air dryer for three minutes so that a skin layer is formed on the supporting film (a composite reverse osmosis membrane (E)). The specific surface area of the skin layer of the composite reverse osmosis membrane (E) was 2.2.

Then, the property of the composite reverse osmosis membrane (D) was measured by using the process shown in FIG. 1. In the process, the composite reverse osmosis membrane (E) was used for the first stage, and the composite reverse osmosis membrane (D) was used for the second stage. The raw liquid was well water of pH 6.5 and its electric conductivity was 100 $\mu$s/cm. The well water was transmitted to the composite reverse osmosis membrane (E) with an operation pressure of 30 kgf/cm$_2$ of and became the supplied water. And the property of the membrane (D) was measured at an operation pressure of 15 kgf/cm$^2$. The resistivity value was 9.9M $\Omega$·cm and the permeation flux was 1.4 m$^3$/(m$^2$·day). A continuous water-running test was carried out for one thousand hours maintaining the conditions. The resistivity value after one thousand hours was 10.0M $\Omega$·cm, and the permeation flux was 1.4 m$^3$/(m$^2$·day), namely, the property did not deteriorate.

COMPARATIVE EXAMPLE 3

A composite reverse osmosis membrane (F) was attained in the same method explained in Example 3 to manufacture the composite reverse osmosis membrane (E) the surface condition thereof was similar to a conventional reverse osmosis membrane, except that IP1016 was not added to the solution containing isophthalic acid chloride. The property was examined as in the Example 3 in which the composite reverse osmosis membrane (E) was used for the first stage and the composite reverse osmosis membrane (F) was used for the second stage. The resistivity value was 7.7M $\Omega$·cm, and the permeation flux was 0.9 m$^3$/(m$^2$·day). The permeation flux and the resistivity value were inferior to those of Example 3.

COMPARATIVE EXAMPLE 4

A composite reverse osmosis membrane (G) was obtained in the same way of Example 3, except that the membrane was not treated with glutaraldehyde. The resistivity value was 9.8M $\Omega$·cm, and the permeation flux was 1.4 m$^3$/

($m^2$·day). After one thousand hours of the continuous water-running test, the resistivity became 5.3M Ω·cm, and the permeation flux was 1.6 $m^3/(m^2$·day), namely the performance deteriorated.

As mentioned above, the composite reverse osmosis membrane of this invention was superior in desalination of mineral salts in a low concentration area and removal of cationic organic materials of multi-stage reverse osmosis membranes system and others. The present composite reverse osmosis membrane also had higher permeability and durability.

This invention provides a highly permeable composite reverse osmosis membrane having a high permeability while maintaining a high salt rejection property. The membrane can be used for desalination (distillation) of brackish water and sea water, or for preparing super-pure water which is necessary for manufacturing semiconductors with less electricity, less energy, less space and lower cost.

According to a preferable embodiment in which the surface area of the polyamide type skin layer is coated with a crosslinked layer of organic polymers having positively-charged groups, the composite reverse osmosis membrane keeps high salt rejection and high permeability. Therefore, the composite reverse osmosis membrane is superior in desalination of mineral salt in a low-concentration region and in removal of cationic organic materials.

This invention may be embodied in other forms without departing from the spirit or essential characteristics thereof. The embodiments disclosed in this application are to be considered in all respects as illustrative and not limitative, the scope for the invention is indicated by the appended claims rather than by the foregoing description, and all changes which come within the meaning and range of equivalency of the claims are intended to be embraced therein.

What is claimed is:

1. A highly permeable composite reverse osmosis membrane, comprising a polyamide skin layer comprising a reaction product of a compound having at least two reactive amino groups and a polyfunctional acid halide compound having at least two reactive acid halide groups, the membrane further comprising a microporous support to support said polyamide skin layer, wherein the specific surface area of said polyamide skin layer ranges from 3 to 1000 and wherein the permeation flux of the membrane is at least 0.65 $m^3/m^2$·day after an aqueous solution of pH 6.5 containing 500 ppm of sodium chloride is permeated for one hour at an operation pressure of 7.5 $kg/cm^2$ at 25° C.

2. The highly permeable composite reverse osmosis membrane according to claim 1, wherein the surface area of said polyamide skin layer is further coated with a crosslinked layer of an organic polymer having positively-charged groups.

3. The highly permeable composite reverse osmosis membrane according to claim 2, wherein the crosslinked layer of the organic polymer having positively-charged groups is produced by crosslinking polymers having quaternary ammonium groups and hydroxyl groups, and the crosslinking system is at least one selected from the group consisting of an intramolecular link and an intermolecular link.

4. The highly permeable composite reverse osmosis membrane according to claim 2, wherein the crosslinked layer of the organic polymer having positively-charged groups is a crosslinked polyethyleneimine.

5. The highly permeable composite reverse osmosis membrane according to claim 2, wherein the average molecular weight of said polyethyleneimine is at least 300.

6. The highly permeable composite reverse osmosis membrane according to claim 2, wherein the crosslinked layer of the organic polymer having positively-charged groups is 1 nm to 10 μm thick.

7. A multi-stage reverse osmosis treatment apparatus, comprising as a second or later stage a membrane module that comprises the highly permeable reverse osmosis membrane according to claim 2.

8. The highly permeable composite reverse osmosis membrane according to claim 1, wherein a compound having a solubility parameter of from 8 to 14 $(cal/cm^3)^{1/2}$ is added at least one solution of a compound selected from the group consisting of a compound having at least two reactive amino groups and a polyfunctional acid halide compound having at least two reactive acid halide groups before the interfacial polycondensation between the two compounds is conducted.

9. The highly permeable composite reverse osmosis membrane according to claim 8, wherein the compound having a solubility parameter of from 8 to 14 $(cal/cm^3)^{1/2}$ is at least one compound selected from the group consisting of alcohols, ethers, ketones, esters, halogenated hydrocarbons, nitrogen-containing compounds and sulfur-containing compounds.

10. The highly permeable composite reverse osmosis membrane according to claim 1, wherein the specific surface area of the polyamide skin layer ranges from 3.1 to 500.

* * * * *